(12) United States Patent
Carfora et al.

(10) Patent No.: US 6,502,308 B1
(45) Date of Patent: Jan. 7, 2003

(54) VEHICLE WHEEL COVER RETENTION SYSTEM AND METHOD FOR PRODUCING SAME

(75) Inventors: Radmila Carfora, Commerce, MI (US); Zvonko Dimovski, Sterling Heights, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 09/831,699

(22) PCT Filed: Dec. 29, 1999

(86) PCT No.: PCT/US99/31115

§ 371 (c)(1),
(2), (4) Date: May 11, 2001

(87) PCT Pub. No.: WO00/43147

PCT Pub. Date: Jul. 27, 2000

Related U.S. Application Data

(60) Provisional application No. 60/114,564, filed on Dec. 31, 1998.

(51) Int. Cl.$^7$ .................................................. B60B 7/06
(52) U.S. Cl. ............................ 29/894.381; 301/37.102; 301/37.11
(58) Field of Search ................... 301/37.101, 37.11, 301/37.35, 37.36, 37.43, 37.102; 29/894.38, 894.381

(56) References Cited

U.S. PATENT DOCUMENTS

| 2,460,123 A | 1/1949 | Cabill |
| 5,595,423 A | 1/1997 | Heck et al. |
| 5,829,843 A | 11/1998 | Eikoff |
| 6,270,167 B1 * | 8/2001 | Kemmerer et al. ...... 301/37.43 |
| 6,406,100 B1 * | 6/2002 | Kinstler ................. 301/37.101 |

* cited by examiner

Primary Examiner—Russell D. Stormer
(74) Attorney, Agent, or Firm—MacMillan, Sobanski & Todd, LLC

(57) ABSTRACT

An improved vehicle wheel cover retention system and method for producing the same includes a wheel cover (16) secured to a vehicle wheel. The method for producing the vehicle wheel (10) includes the steps of: (a) providing a vehicle wheel including a disc (14) defining an outboard facing wheel surface and including an outboard tire bead seat retaining flange (20), the outboard bead seat retaining flange including an outer peripheral end having an annular groove (64) formed therein; (b) providing a wheel cover defining an inner cover surface and an outer cover surface, the wheel cover including an outer end (70); (c) applying a sealant (82) to one of the outboard facing wheel surface and the inner cover surface; (d) supporting the wheel and the cover in coaxial relationship relative to one another; (e) selectively moving the wheel and the cover toward one another to enable the sealant to initially secure the wheel and the cover together; (f) providing a metal deforming tool (100) having a tool end, the tool end having a leading end (102A) and a trailing end (102B), the leading end defining a first tool profile and the trailing end defining a second tool profile which is different from the first tool profile; and (g) selectively operating the metal deforming tool to cause the leading end of the tool to initially engage and deform the outer end of the wheel cover followed by the trailing end of the tool engaging the deforming the outer end of the wheel cover into the groove in a permanent mechanical lock connection therewith whereby the wheel cover covers at least a portion of the outboard facing wheel surface and the entire portion of the outer peripheral end of the outboard bead seat retaining flange (34).

16 Claims, 8 Drawing Sheets

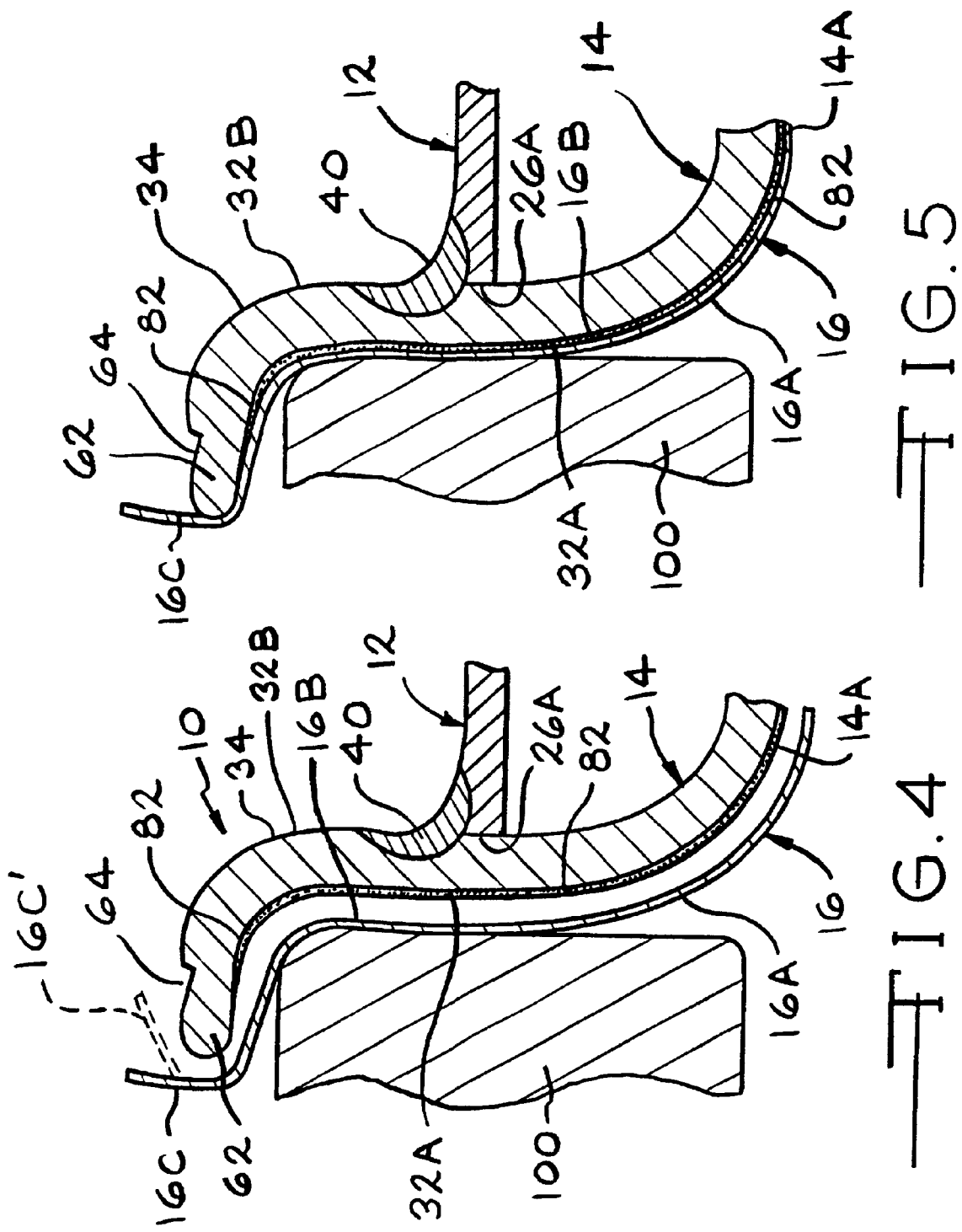

VEHICLE WHEEL COVER RETENTION SYSTEM AND METHOD FOR PRODUCING SAME

This application claims the benefit of provisional application No. 60/114,564 filed on Dec. 31, 1998.

BACKGROUND OF THE INVENTION

This invention relates in general to vehicle wheels and, in particular, to an improved vehicle wheel cover retention system and method for producing the same.

Full or partial vehicle wheel covers of the removable type are well known., and have been used for many years to enhance the styling of conventional, stamped wheel discs. Also, it is known to secure a full or partial wheel cover to a vehicle wheel using an adhesive.

One example of a vehicle wheel with a wheel cover secured thereto is disclosed in U.S. Pat. No. 3,726,566 to Beith. In the Beith patent, a wheel cover includes a radially and axially outward curving terminal flange having a lip which is formed to grip the edge of the terminal flange of the wheel rim to aid in fixing the wheel cover to the vehicle wheel. An adhesive is placed between the confronting surfaces of the wheel cover and the vehicle wheel to permanently secure the wheel cover to the vehicle wheel.

Another example of a vehicle wheel having a wheel cover secured thereto is disclosed in U.S. Pat. No. 5,595,423 to Heck et al. In the Heck et al. patent, a wheel cover includes an outer end which is received in a groove formed in the outboard tire bead seat retaining flange of the vehicle wheel. An adhesive is preferably deposited in a predetermined pattern on the outboard face of the vehicle wheel so that when the wheel cover is installed, the adhesive assists in securing the wheel cover to the vehicle wheel.

SUMMARY OF THE INVENTION

An improved vehicle wheel cover retention system and method for producing the same includes a wheel cover secured to a vehicle wheel. The method for producing the vehicle wheel includes the steps of: (a) providing a vehicle wheel including a disc defining an outboard facing wheel surface and including an outboard tire bead seat retaining flange, the outboard bead seat retaining flange including an outer peripheral end having an annular groove formed therein; (b) providing a wheel cover defining an inner cover surface and an outer cover surface, the wheel cover including an outer end; (c) applying a sealant to one of the outboard facing wheel surface and the inner cover surface; (d) supporting the wheel and the cover in coaxial relationship relative to one another; (e) selectively moving the wheel and the cover toward one another to enable the sealant to initially secure the wheel and the cover together; (f) providing a metal deforming tool having a tool end, the tool end having a leading end and a trailing end, the leading end defining a first tool profile and the trailing end defining a second tool profile which is different from the first tool profile; and (g) selectively operating the metal deforming tool to cause the leading end of the tool to initially engage and deform the outer end of the wheel cover followed by the trailing end of the tool engaging the deforming the outer end of the wheel cover into the groove in a permanent mechanical lock connection therewith whereby the wheel cover covers at least a portion of the outboard facing wheel surface and the entire portion of the outer peripheral end of the outboard bead seat retaining flange.

Other advantages of this invention will become apparent to those skilled in the art from the following detailed description of the preferred embodiments, when read in light of the accompanying drawings.

BRIEF DESCRIPTION OF THE DRAWINGS

FIG. 4 is an enlarged sectional view of a selected portion of the vehicle wheel illustrated in FIG. 2, and showing the initial installation operation of the wheel cover.

FIGS. 5-7 are an enlarged sectional view showing intermediate installation operations of the wheel cover illustrated in FIG. 4.

DETAILED DESCRIPTION OF THE PREFERRED EMBODIMENTS

Figure 1:
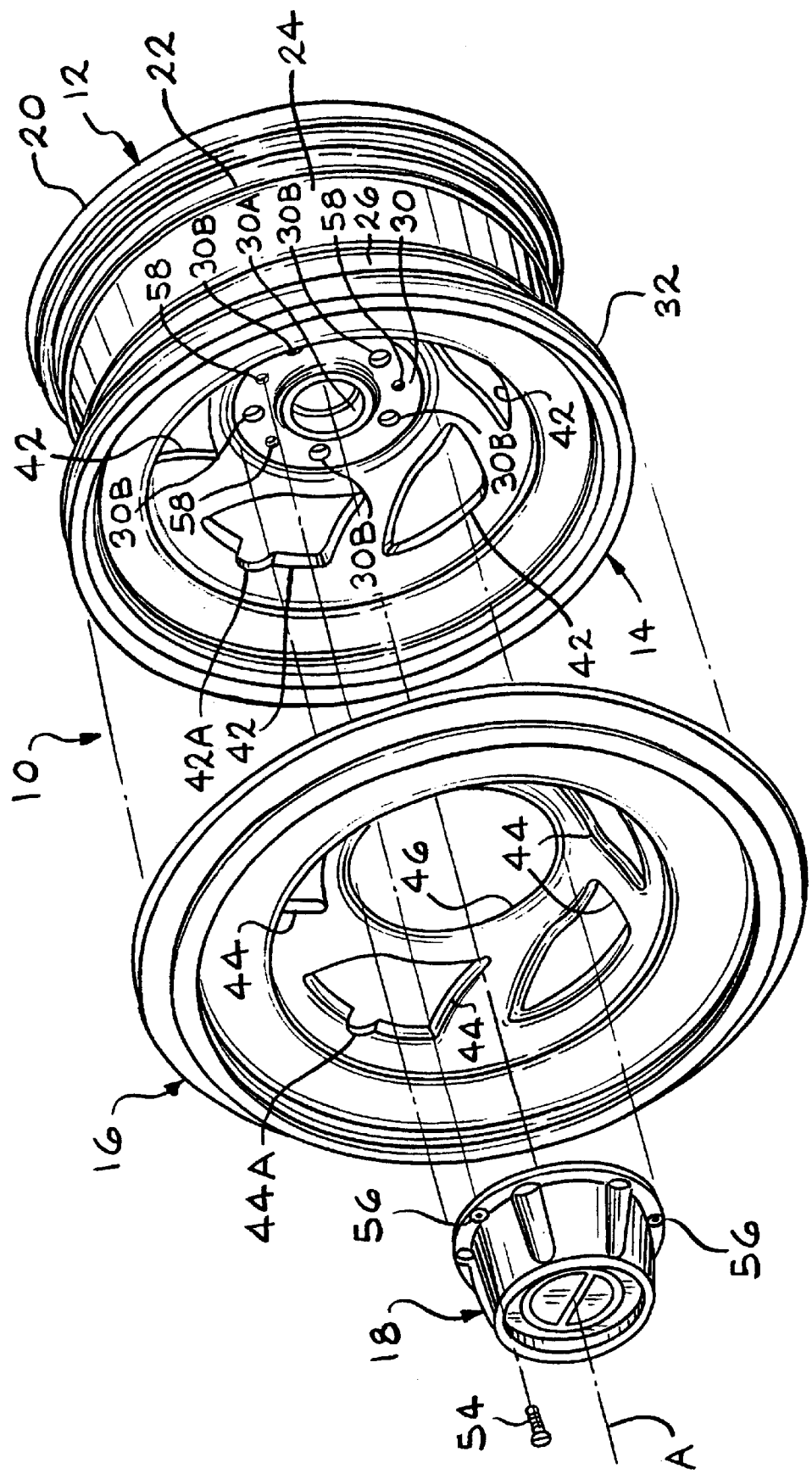
FIG. 1 is an exploded perspective view of a first embodiment of an improved vehicle wheel constructed in accordance with the present invention.
Figure 3:
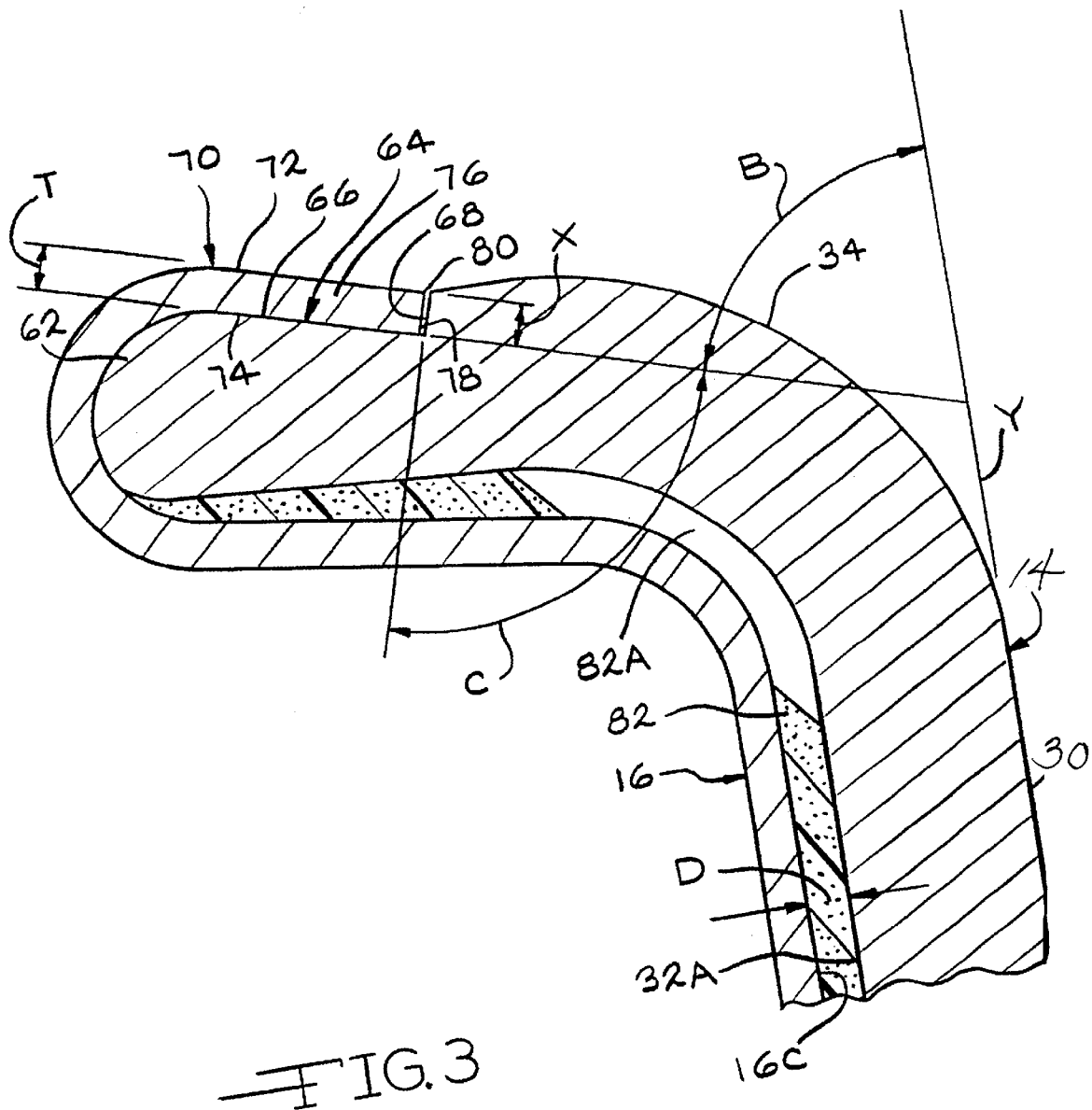
FIG. 3 is an enlarged sectional view of a selected portion of the vehicle wheel illustrated in FIG. 2.

Referring now to the drawings, there is illustrated in FIG. 1 an exploded perspective view of a first embodiment of a vehicle wheel, indicated generally at 10, including a vehicle wheel cover retention system in accordance with the present invention. The vehicle wheel 10 shown in this embodiment is a full face type of wheel, defines a vehicle wheel axis A, and includes a wheel rim 12, a full face wheel disc 14, a wheel cover 16, and a cap 18. Although this invention is discussed in conjunction with the particular vehicle wheel disclosed herein, it will be appreciated that the invention may be used in conjunction with other types of vehicle wheel constructions. For example, the vehicle wheel can be a "bead seat attached" wheel (such as shown in FIG. 4 of U.S. Pat. No. 5,188,429 to Heck et al.), a "well attached" vehicle wheel (such as shown in FIG. 3 of Heck et al.), a "bimetal" vehicle wheel construction including an aluminum wheel disc and a steel wheel rim (such as shown in U.S. Pat. No. 5,421,642 to Wei et al.), or a "modular" vehicle wheel construction including a "partial" wheel rim and a "full face" wheel disc (such as shown in U.S. Pat. No. 5,360,261 to Archibald et al.), all the disclosures of these patents incorporated herein by reference.

The wheel rim 12 is a fabricated rim constructed of steel, aluminum, or other suitable alloy materials. The wheel rim 12 includes an inboard tire bead seat retaining flange 20, an inboard tire bead seat 22, a generally axially extending well 24, and an outboard tire bead seat 26. The wheel rim 12 further includes an opening (not shown) formed therein to accommodate a valve stem (not shown).

The wheel disc 14 is forged, cast, fabricated, or otherwise formed, and is constructed of steel, aluminum, or other suitable alloy materials. The wheel disc 14 includes a generally centrally located wheel mounting surface 30, and an outer annular portion 32. The wheel mounting surface 30 is provided with a centrally located pilot aperture 30A, and a plurality of lug bolt receiving holes 30B (five of such lug bolt receiving holes 30B being illustrated in this embodiment). The lug bolt receiving holes 30B are adapted to receive lug bolts (not shown) for securing the vehicle wheel 10 on a vehicle axle (not shown).

Figure 2:
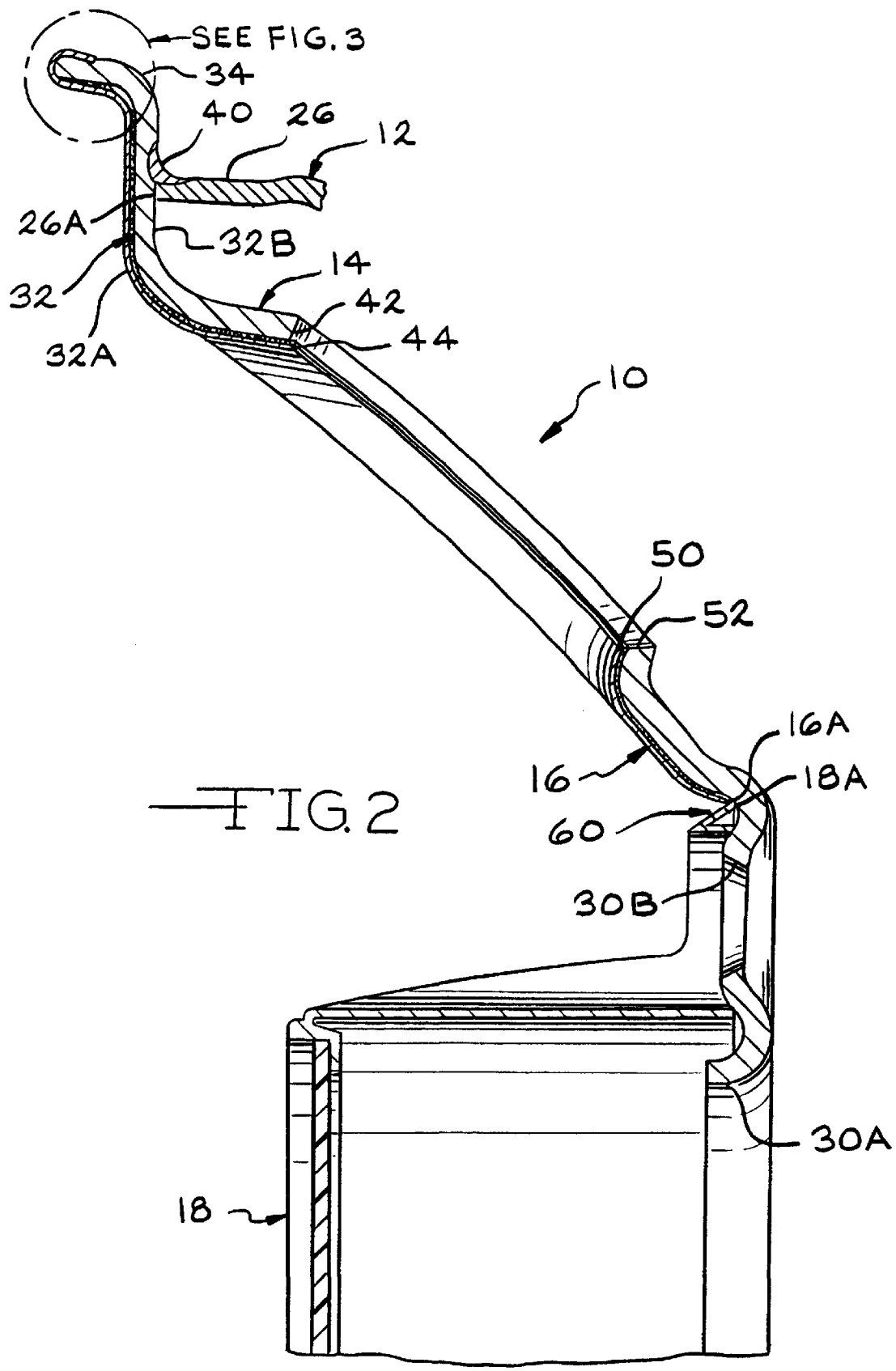
FIG. 2 is a sectional view of a selected portion of the vehicle wheel illustrated in FIG. 1.

The outer annular portion 32 of the wheel disc 14 defines an outboard tire bead seat retaining flange 34 of the vehicle wheel 10, and includes an outer surface 32A and an inner surface 32B, as shown in FIG. 2. To assemble the vehicle wheel 10, an outboard end 26A of the outboard tire bead seat 26 of the wheel rim 12 is positioned against the inner surface 32B of the outer annular portion 32 of the wheel disc 14 and a weld 40 is provided to join the wheel disc 14 and the wheel rim 12 together as shown in FIG. 2. The wheel disc 14 further included a plurality of decorative windows 42 (four of such windows 42 being illustrated in FIG. 1). As shown in this embodiment, one of the windows 42 includes a cut-out portion 42A (shown in FIG. 1), to accommodate the valve stem.

The wheel cover 16 shown in this embodiment is preferably formed from stainless steel having a thickness of approximately 0.020 inch, and is painted, chrome-plated, polished, or otherwise finished. The wheel cover 16 is prefabricated to generally match the particular configuration of the outboard facing surface of the wheel disc 14. In particular, the wheel cover 16 includes a plurality of decorative openings 44 formed therein which correspond to the windows 42 formed in the wheel disc 14, and an enlarged central opening 46. One of the openings 44 includes a cut-out portion 44A which generally corresponds to the cut-out 42A provided in the one window 42 to accommodate the valve stem. Alternatively, the wheel cover can be formed from other materials if desired.

The openings 44 in the wheel cover 16 are preferably formed by a stamping operation. Also, as best shown in FIG. 2, edges 50 of the wheel cover openings 44 preferably extend slightly past edges 52 of the windows 42 to effectively overlap the edges 52 of the windows 42. As a result of this, when as wheel cover 16 which has been chrome-plated is joined to the wheel disc 14, the completely assembled vehicle wheel 10 of the present invention has the appearance of a "chrome-plated" wheel.

As shown in this embodiment, the cap 18 is secured to the wheel disc 14 by a plurality of fasteners 54 (only one of such fasteners 54 being illustrated in FIG. 1). The fasteners 54 extend through openings 56 formed in the cap 18, and are received in threaded inserts 58 which are secured in openings provided in the wheel mounting surface 30 of the wheel disc 14. An inner edge 16A of the wheel cover 16 can either be located outside an outer peripheral edge 18A of the cap 18 (indicated generally at 60 in FIG. 2), or, alternatively, the inner edge 16A of the wheel cover 16 can extend radially inwardly and under outer peripheral edge 18A of the cap 18 (not shown).

As shown in FIG. 3, the outboard tire bead seat retaining flange 34 of the wheel disc 14 includes a generally smooth, rounded outer peripheral end 62, and a circumferential, radially outwardly facing groove or recess 64. Preferably, the peripheral end 62 and the groove 64 are formed by a machining operation to predetermined specifications. However, the peripheral end 62 and/or the groove 64 can be formed by other methods. For example, the peripheral end 62 and/or the groove 64 can be formed by a stamping operation or a spinning operation.

The groove 64 is formed in the inner surface 32B of the outboard tire bead seat retaining flange 34 of the wheel disc 14, and is defined by a first surface 66 which extends in a generally axial direction, and a second surface 68 which extends in a generally radial direction a predetermined distance X. In particular, the surfaces 66 and 68 are oriented at predetermined angles B and C, respectively, relative to a reference line Y which is defined by the inner surface 32B of the wheel disc 14 and is generally perpendicular to the wheel axis A. The angle B is in the range of 60° to 80°, and the angle C is in the range of 60° to 120°. Preferably, as illustrated in this embodiment, the angle B is approximately 70°, and the angle C is approximately 90°. As will be discussed below, the distance X is selected to that an outer end, indicated generally at 70, of the wheel cover 16 is preferably completely recessed within the groove 64. Also, as will be discussed, a mechanical lock is formed when the outer end 70 of the wheel cover 16 is disposed in the groove 64 so as to function as the primary retention means of the wheel cover 16 to the wheel disc 14 of the associated vehicle wheel.

The outer end 70 of the wheel cover 16 defines an outer surface 72, an inner surface 74, and an outer annular lip 76. The outer annular lip 76 defines an outer peripheral edge 78. As shown in this embodiment, the inner surface 74 of the wheel cover 16 contacts the adjacent first surface 66 of the groove 64, and the outer peripheral edge 78 of the wheel cover 16 is spaced slightly from the adjacent second surface 68 of the groove 64; however, in some instances, depending upon the uniformity of the outer peripheral edge 78 dimension of the wheel cover 16, there may be some contact (not shown) between the outer peripheral edge 78 and the second surface 68 to accommodate small dimensional changes in the outer peripheral edge 78 of the wheel cover 16. The outer peripheral edge 78 of the wheel cover 16 defines an outer circle 80.

In order to assist in securing the wheel cover 16 to the wheel disc 14, a sealant/adhesive 82, such as a silicone or two-part epoxy, is utilized. A suitable two-part epoxy is FUSOR 380/383 or FUSOR 320/322, both manufactured by Lord Corporation. The sealant/adhesive 82 is preferably selectively applied on the outboard face of the wheel disc 14 in a predetermined pattern so that when the wheel cover 16 is installed on the wheel disc 14, a smearing of the sealant/adhesive 82 over substantially the entire outboard face of the wheel disc 14 occurs. The predetermined pattern can be similar to that disclosed in U.S. Pat. No. 5,435,631 to Maloney et al., the disclosure of which is incorporated herein by reference. The predetermined pattern of the sealant/adhesive 82 preferably creates voids or gaps 82A (shown in FIG. 3) in the sealant/adhesive coverage where sealing may not be required. The sealant/adhesive 82 functions to assist in securing the wheel cover 16 to the wheel disc 14. In particular, as will be discussed, the adhesive/sealant functions to retain the wheel cover 16 on lo the wheel disc 14 until the outer end 70 of the wheel cover 16 is deformed and disposed in the groove 64 in a "mechanical lock" therewith. Also, the pattern of the adhesive 82 is effective to provide a seal and prevent water, mud, salt and other debris from entering between the wheel cover 16 and the outboard facing surface of the wheel disc 14. Alternatively, the application of the sealant/adhesive 82 can be other than illustrated if desired. For example, the sealant/adhesive 82 can be selectively applied to an inner surface 16C of the wheel cover 16 in a predetermined pattern, or can be selectively applied to both the outboard face of the wheel disc 14 and the inner surface of the wheel cover 16 in a predetermined pattern.

The distance X of the second surface 76 of the groove 64 is at least equal to a thickness T of the wheel cover 16 so that the outer circle 80 of the wheel cover 16 is recessed relative to the inner surface 32B of the outboard tire bead seat retaining flange 34 of the associated wheel disc 14. This effectively hides the outer peripheral edge 78 of the wheel cover 16. Preferably, the distance X is greater than the thickness T of the wheel cover 16 to accommodate the natural spring back of the outer end 70 of the wheel cover 16. For example, if the wheel cover 16 has a thickness of approximately 0.020 inch, the distance X is approximately 0.030 inch. Also, the outer end 70 of the wheel cover 16 is preferably sized to ensure that an end of a wheel balance weight (not shown) is frictionally retained on the outer surface 72 of the wheel cover 16 and not on the outboard tire bead seat retaining flange 34 of the vehicle wheel 10.

Referring now to FIGS. 4 through 9, there is illustrated a first sequence of operations for producing the vehicle wheel 10 in accordance with this invention. Initially, as shown in FIG. 4, the wheel cover 16 is positioned adjacent an outer surface 14A of the wheel disc 14 with a tool 100 positioned adjacent a portion of an outer surface 16A of the wheel cover 16. The tool 100 is mounted on a support member (not shown) which allows the tool 100 to travel in an generally axial direction toward the wheel disc 14. In this embodiment, the sealant/adhesive 82 is preferably applied to the outer surface 32A of the wheel disc 14. Alternatively, the sealant/adhesive 82 can be applied to the inner surface 16B of the wheel cover 16, or to both the outer surface 32A of the wheel disc 14 and the inner surface 16B of the wheel cover 16.

As shown in FIG. 4, the wheel cover 16 is prefabricated in such a manner so as to generally correspond to the profile of the outer surface 32A of the wheel disc 14 except near the outer peripheral end 62 thereof wherein an outer end 16C of the wheel cover 16 extends in a generally radially outwardly extending direction. Alternatively, as shown in phantom in FIG. 4, an outer end 16C' of the wheel cover 16 can have a generally U-shaped configuration which generally corresponds to the configuration of the outer peripheral end 62 of the wheel disc 14.

Figure 6:
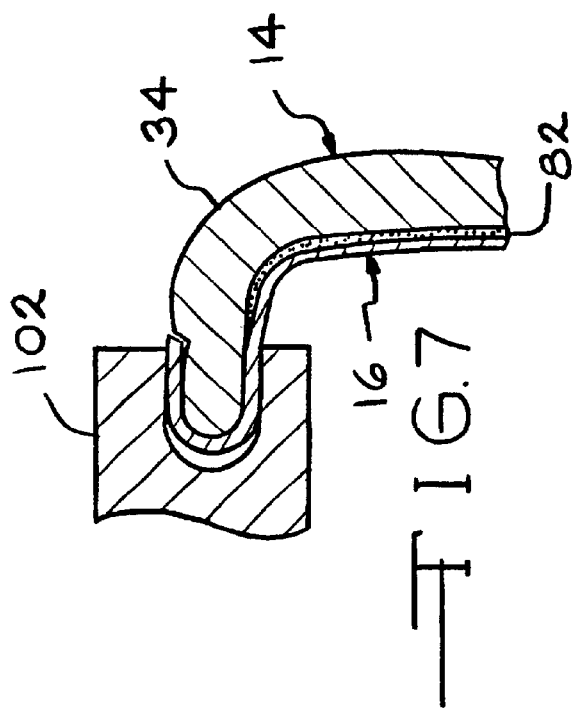
Figure 7:
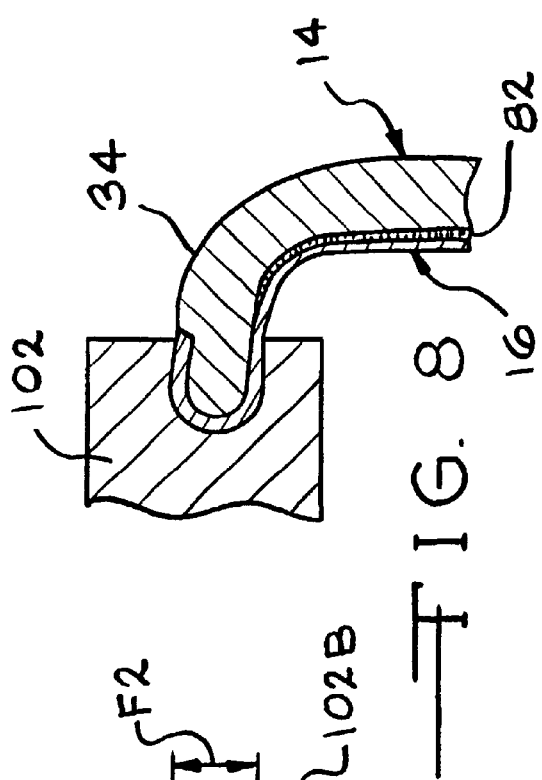
Figure 8:
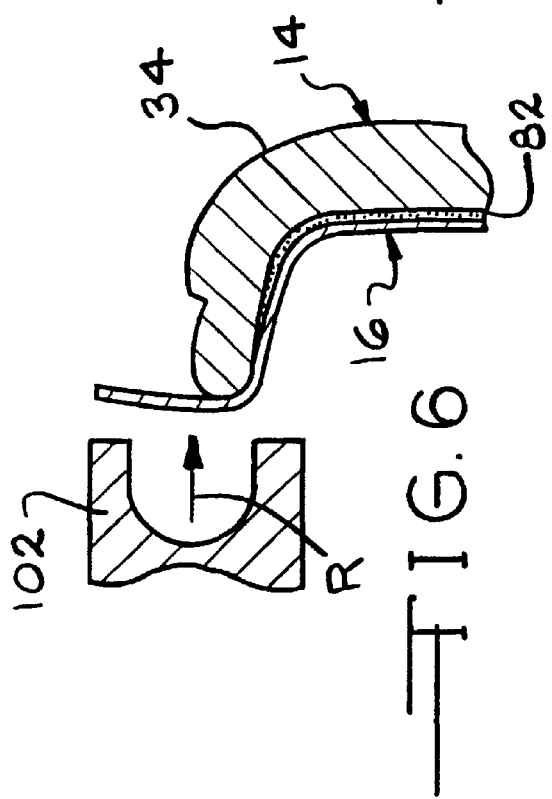
FIG. 8 is an enlarged sectional view showing the final installation operation of the wheel cover illustrated in FIG. 4.

As shown in FIG. 5, the tool 100 is moved in a generally axial direction toward the wheel disc 14 and presses the wheel cover 16 against the wheel disc 14 in a predetermined position. In particular, the tool 100 is effective to space the inner surface 16B of the wheel cover 16 a predetermined distance D (shown in FIG. 3) from the outer surface 32A of the wheel disc 14 such that there is a sufficient thickness of the sealant/adhesive 82 at the interface between the wheel disc 14 and the wheel cover 16. The distance D is generally equal to the sum of the thickness of the wheel cover 16 and a desired adhesive/sealant 82 thickness: Following this, as shown in FIGS. 6–8, the outer end 16C of the wheel cover 16 is engaged by a tool 102 which is operative to form or reshape the outer end 16C over the outer peripheral end 62 of the wheel disc 14 so as to mechanically lock the wheel cover 16 to the wheel disc 14 and form the finished wheel 10. In the illustrated embodiment, the tool 102 is in the shape of a generally round wheel and is mounted on a support member (not shown) which allows the tool 102 to be moved in a generally circular path relative to the outer peripheral end 62 of the outboard tire bead seat retaining flange 34 of the wheel disc 14. In the illustrated embodiment, the tool 100 and the tool 102 are separate components. Alternatively, the tool 100 and the tool 102 can be other than illustrated if desired. For example, the tool 100 and the tool 102 can be formed as part of a unitary tool component.

Figure 9:
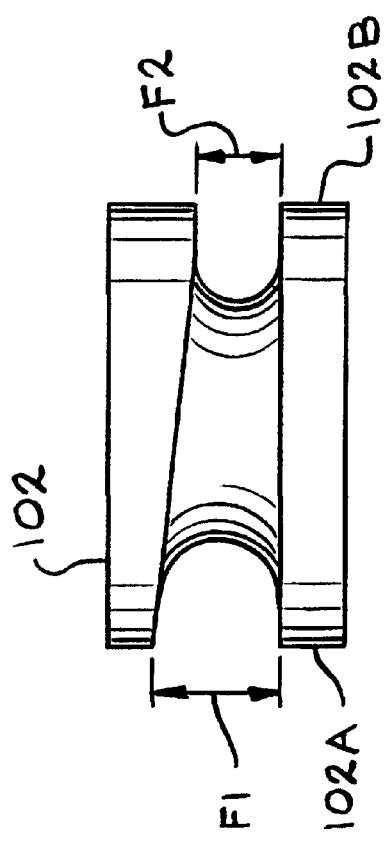
FIG.9 is a plan view of the tooling shown in FIGS. 6 and 7 used to install the wheel cover.

As best shown in FIG. 9, in this embodiment the tool 102 has a leading or front end 102A and a trailing or rear end 102B. The leading end 102A of the tool 102 defines a first tool diameter F1, and the trailing end 102B of the tool 102 defines a second tool diameter F2 which is less than the first tool diameter F1. As will be discussed, the leading end 102A of the tool 102 is operative to initially engage the outer end 16C of the wheel cover 16, and the tool 102 is selectively moved relative to the vehicle wheel 10 and the wheel cover 16 so that the trailing end 102B of the tool 102 is operative to final form the outer end 16C of the wheel cover 16 into the groove 64.

As shown in FIGS. 6 and 7 of this embodiment, the tool 102 is advanced in a generally axial direction as shown by arrow R in FIG. 6 causing the leading tool end 102A to initially engage and deform the outer end 16C of the wheel cover 16. As the vehicle wheel 10 is rotated, the tool 102 is also progressively rotated at a desired rate relative thereto so that the tool 102 is operative to deform the outer end 16C of the wheel cover 16 into the groove 64 so as to mechanically lock the wheel cover 16 to the wheel disc 14 and produce the finished vehicle wheel 10 having a finished outer end 16D, shown in FIG. 8, which is seated in the groove 64 in accordance with the present invention. In the illustrated embodiment, since the wheel cover 16 is formed from a relatively strong material, this movement does not cause a thinning of the thickness of the wheel cover 16 but only is effective to deform the outer end 16C of the wheel cover 16 and cause the finish formed outer end 16D to seat into the groove 64. In this embodiment, the vehicle wheel 10 rotates and the tool 102 rotates relative thereto. Alternatively, depending upon the particular construction of the tool 102 (and the tool 100), the movement of one or more of the vehicle wheel 10, the tool 100, and the tool 102 can be other than illustrated if desired.

Turning now to FIGS. 10 through 13, and using like reference numbers to for corresponding parts, there is illustrated a second embodiment of a vehicle wheel 10' including a "full" wheel rim 12', a wheel disc 14', and a wheel cover 16', and a second sequence of operations for installing the wheel cover 16' in a groove 64' of the associated vehicle wheel 10'.

As shown in this embodiment, the outboard tire bead seat retaining flange 34' of the wheel rim 12' of the vehicle wheel 10' includes a generally smooth, rounded outer peripheral end 62', a circumferential, radially outwardly facing first groove 64', and a circumferential, radially outwardly facing second groove 164. Preferably, the peripheral end 62', the first groove 64', and the second groove 164 are formed by a machining operation to predetermined specifications. However, one or more of the peripheral end 62', the first groove 64', and the second groove 164 can be formed by other methods. For example, the peripheral end 62' and/or the grooves 64' and 164 can be formed by a stamping operation or a spinning operation.

The first groove 64' is formed in an inner surface 32B' of the outboard tire bead seat retaining flange 34' of the vehicle wheel 10, and is defined by a first surface 66' which extends in a generally axial direction, and a second surface 68' which extends in a generally radial direction a predetermined distance X'. In particular, the surfaces 66' and 68' are oriented at predetermined angles B' and C', respectively, relative to a reference line Y' which is parallel to an inner surface 14A'(shown in FIG. 10) of the vehicle wheel 10' and which is generally perpendicular to the wheel axis A'. The angle B' is in the range of 60° to 120°, and the angle C' is in the range of 55° to 95°. Preferably, as illustrated in this embodiment, the angle B' is approximately 90°, and the angle C' is approximately 75°. As will be discussed below, the distance X' is selected so that an outer end, indicated generally at 70', of the wheel cover 16' is preferably completely recessed within the groove 64'. Also, as will be discussed, a mechanical lock is formed when the outer end 70' of the wheel cover 16' is disposed in the groove 66'(and also the groove 164) so as to function as the primary retention means of the wheel cover 16' to the wheel disc 14' of the associated vehicle wheel.

The second groove 164 is formed in an outer surface 32A' of the outboard tire bead seat retaining flange 34' of the vehicle wheel 10' and is defined by a first surface 166' which extends in a generally axial direction, and a second surface 168' which extends in a generally radial direction. In particular, the surfaces 166' and 168' are oriented at predetermined angles B1' and C1', respectively, relative to the reference line Y. The angle B1' is in the range of 70° to 130°, and the angle C1' is in the range of 55° to 95°. Preferably, as illustrated in this embodiment, the angle B1' is approximately 100°, and the angle C1' is approximately 75°.

Figure 13:
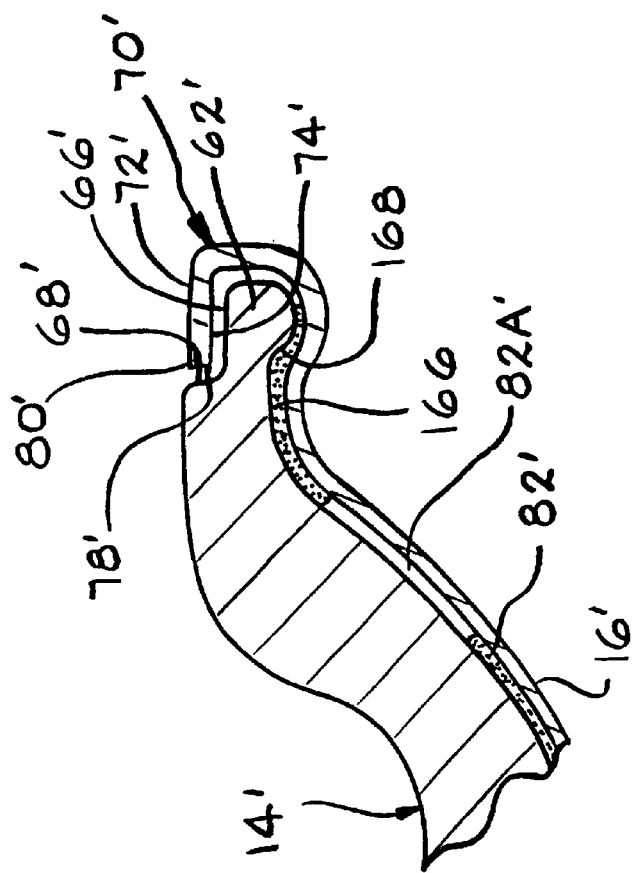
FIG. 13 In enlarged sectional view showing the final installation operation of the wheel cover illustrated in FIG. 10, the tooling not being shown.
Figure 12:
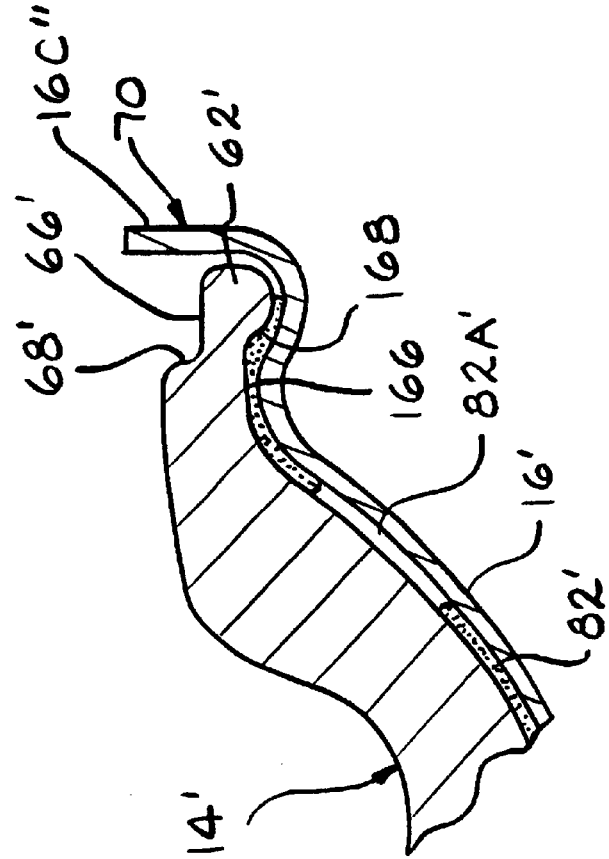
FIG. 12 enlarged sectional view showing the initial installation operation of the wheel cover illustrated in FIG. 10, the tooling not being shown.

As shown in FIG. 13, in the fully assembled vehicle wheel 10', an inner surface 74' of the wheel cover 16' is slightly spaced from contact with the adjacent first surface 166' of the first groove 64' and the adjacent second surface 168' of the second groove 164'; however, in some instances, depending upon the uniformity of the wheel cover 16', there may be some contact (not shown) between the inner surface 74' and one or both of the first surface 166' and the second surface 168' to accommodate small dimensional changes in the wheel cover 16'.

In order to assist in securing the wheel cover 16' to the vehicle wheel 10', a sealant/adhesive 82', such as a silicone or two-part epoxy, is utilized. The sealant/adhesive 82' is preferably selectively applied on the outboard face of the vehicle wheel 10' in a predetermined pattern so that when the wheel cover 16' is installed thereon, a smearing of the sealant/adhesive 82' over substantially the entire outboard face of the vehicle wheel disc 10' occurs. The predetermined pattern of the sealant/adhesive 82' creates voids or gaps 82A' in the sealant/adhesive coverage where sealing may not be required. The sealant/adhesive 82' assists in securing the wheel cover 16' to the vehicle wheel 10'. In particular, as will be discussed, the adhesive/sealant functions to retain the wheel cover 16' on the wheel disc 14 until the outer end 70' of the wheel cover 16' is deformed and disposed in the groove 64' in a "mechanical lock" therewith. Also, the pattern of the adhesive 82 is effective to provide a seal and prevent water, mud, salt and other debris from entering between the wheel cover 16 and the outboard facing surface of the vehicle wheel 10'. Alternatively, the sealant/adhesive 82' can be selectively applied to an inner surface 16B' of the wheel cover 16' in a predetermined pattern, or can be selectively applied to both the outboard face of the vehicle wheel disc 10' and the inner surface 16B' of the wheel cover 16' in a predetermined pattern.

The distance X' of the second surface 68' of the groove 64' is at least equal to a thickness of the wheel cover 16' so that an outer circle 80' of the wheel cover 16' is recessed relative to an inner surface 32B' of the outboard tire bead seat retaining flange 34' of the associated wheel disc 14'. This effectively hides an outer peripheral edge 78' of the wheel cover 16'. Preferably, the distance X' is greater than the thickness of the wheel cover 16' to accommodate the natural spring back of the outer end 70' of the wheel cover 16'. For example, if the wheel cover 16' has a thickness of approximately 0.020 inch, the distance X' is approximately 0.030inch. Also, the outer end 70' of the wheel cover 16' is preferably sized to ensure that an end of a wheel balance weight (not shown) is frictionally retained on an outer surface 72' thereof and not on the outboard tire bead seat retaining flange 34' of the associated vehicle wheel 10'.

Figure 10:
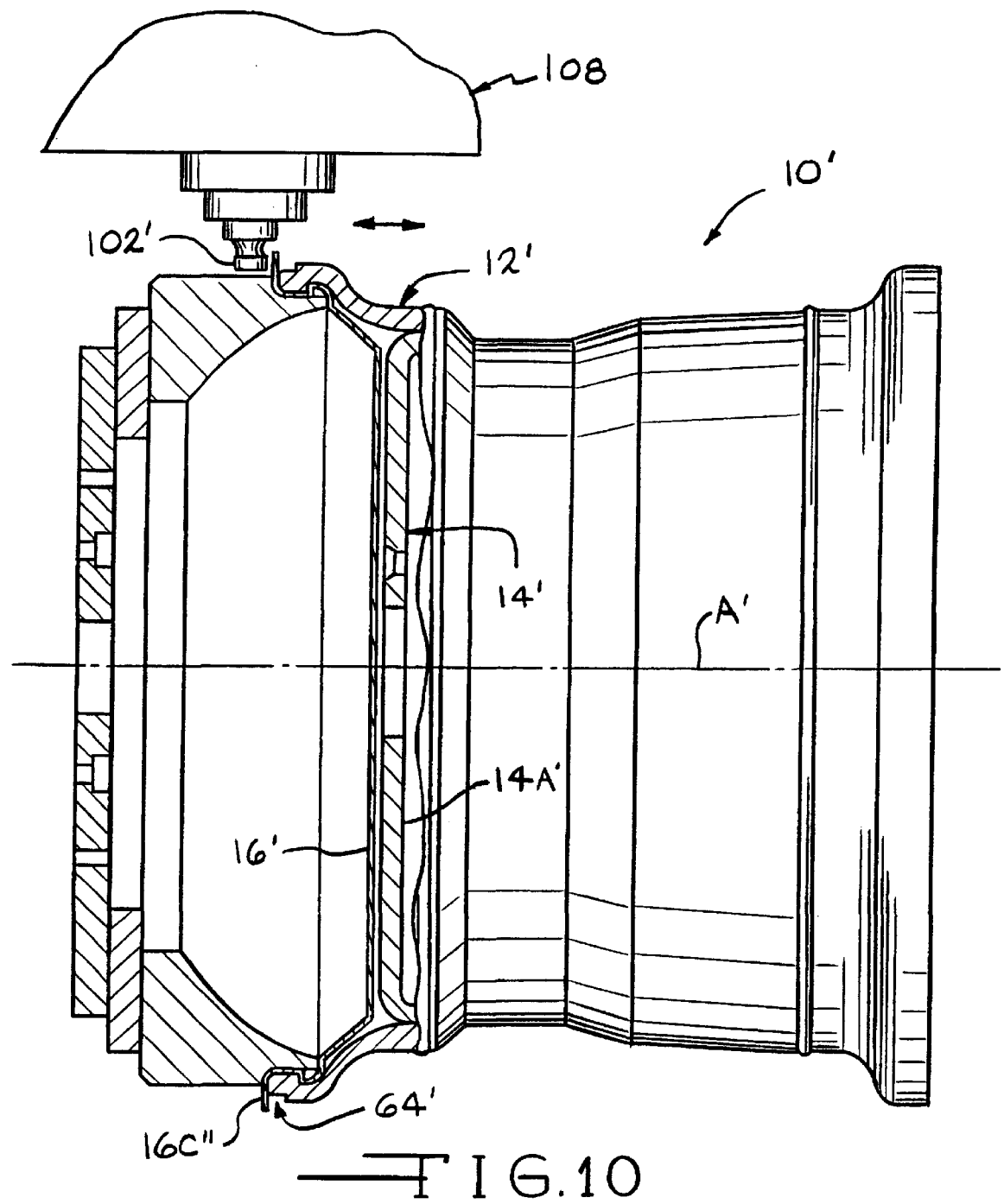
FIG. 10 a partial sectional view showing a second embodiment of an improved vehicle wheel constructed in accordance with the present invention and showing the initial installation operation of the wheel cover on the associated vehicle wheel.
Figure 11:
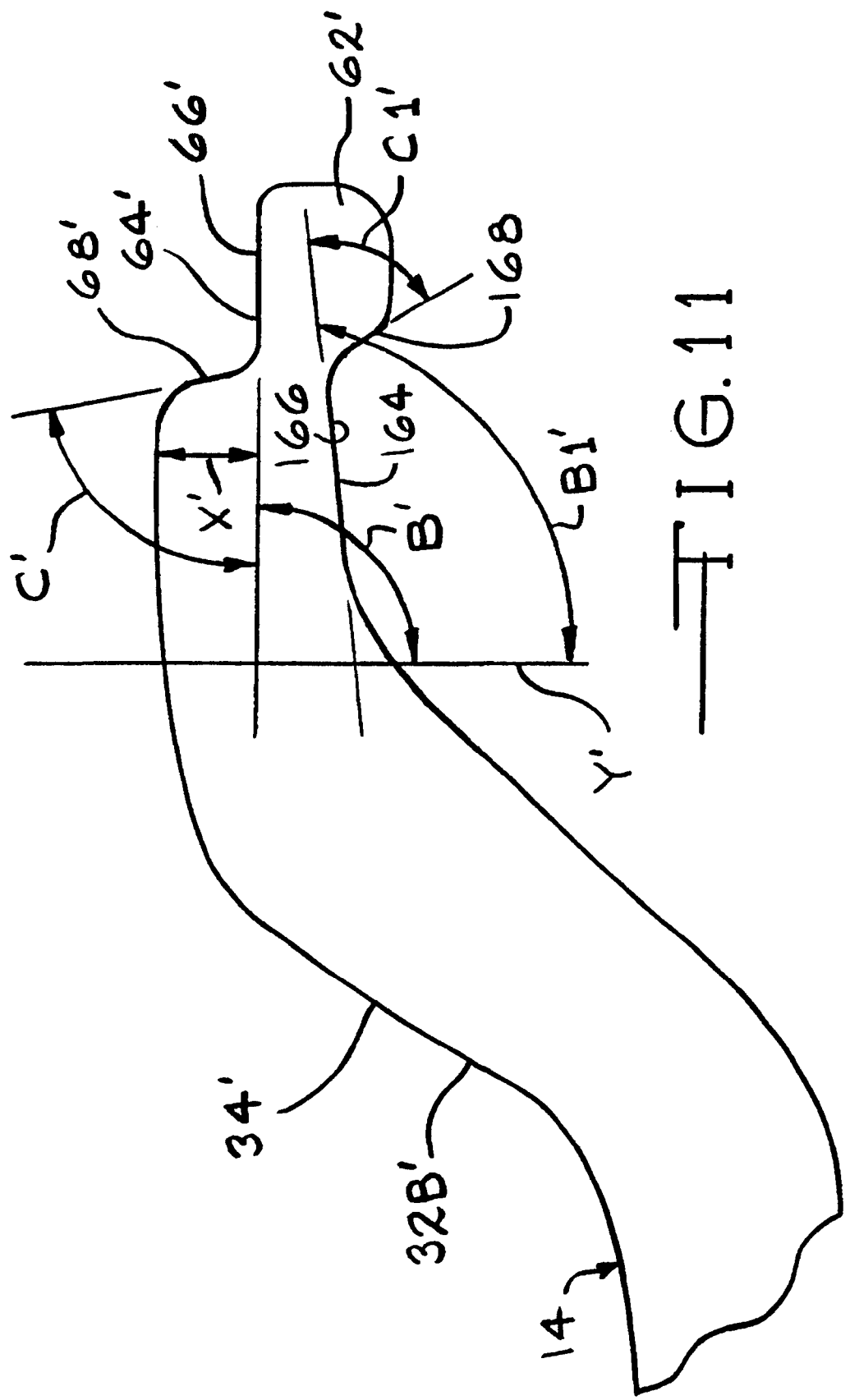
FIG. 11 is an enlarged sectional view showing a selected portion of the vehicle wheel illustrated in FIG. 10, the wheel cover not being shown.

As shown in FIG. 10, to fully install the wheel cover 16' on the vehicle wheel 10, a forming roller 102' supported by a support member 108 is actuated to engage and deform an outer end 16C' of the wheel cover 16' and cause the finish formed outer end 70' to seat into the groove 64' so as to mechanically lock the wheel cover 16' to the wheel disc 14' and produce the finished vehicle wheel 10'.

In accordance with the provisions of the patents statues, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A method for producing a vehicle wheel comprising the steps of:
    (a) providing a vehicle wheel including a disc defining an outboard facing wheel surface and including an outboard tire bead seat retaining flange, the outboard bead seat retaining flange including an outer peripheral end having an annular groove formed therein;
    (b) providing a wheel cover defining an inner cover surface and an outer cover surface, the wheel cover including an outer end;
    (c) applying a sealant to one of the outboard facing wheel surface and the inner cover surface;
    (d) supporting the wheel and the cover in coaxial relationship relative to one another;
    (e) selectively moving the wheel and the cover toward one another to enable the sealant to initially secure the wheel and the cover together;
    (f) providing a metal deforming tool having a tool end, the tool end having a leading end and a trailing end, the leading end defining a first profile and the trailing end defining a second tool profile which is different from the first tool profile; and
    (g) selectively operating the metal deforming tool to cause the leading end of the tool to initially engage and deform the outer end of the wheel cover followed by the trailing end of the tool engaging the deforming the outer end of the wheel cover into the groove in a permanent mechanical lock connection therewith whereby the wheel cover covers at least a portion of the outboard facing wheel surface and the entire portion of the outer peripheral end of the outboard bead seat retaining flange.

2. The method according to claim 1 wherein the leading end of the tool end defines a first tool diameter and the trailing end of the tool end defines a second tool diameter which is less than the first tool diameter.

3. The method according to claim 1 wherein the wheel cover is prefabricated so as to generally correspond to the profile of the outer surface of the wheel disc except near the outer peripheral end thereof, wherein the outer end of the wheel cover extends in a generally radially outwardly extending direction.

4. The method according to claim 1 wherein the outer end of the wheel cover is prefabricated so as to generally correspond to the profile of the outer surface of the wheel disc and includes a generally U-shaped configuration which generally corresponds to the profile of the outer peripheral end of the wheel disc.

5. The method according to claim 1 wherein the metal deforming tool is moved in a generally axial direction toward the wheel disc.

6. The method according to claim 1 wherein the metal deforming tool is effective to space the inner cover surface of the wheel cover a predetermined distance from the outboard facing surface of the wheel disc such that there is a sufficient thickness of the sealant at the interface between the wheel disc and the wheel cover.

7. The method according to claim 1 wherein the tool end is in the shape of a generally round wheel and is mounted on a support member which allows the tool end to be moved in a generally circular path relative to the outer peripheral end of the wheel disc 14.

8. The method according to claim 1 wherein the wheel cover is formed from stainless steel and is painted.

9. The method according to claim 1 wherein the wheel cover is formed from stainless steel and is chrome-plated.

10. The method according to claim 1 wherein the wheel cover is formed from stainless steel and is polished.

11. A vehicle wheel produced in accordance with the method defined in claim 1.

12. The vehicle wheel defined in claim 11 wherein the vehicle wheel is a full face type of wheel.

13. The vehicle wheel defined in claim 11 wherein the vehicle wheel is a bead seat attached type of wheel.

14. The vehicle wheel defined in claim 11 wherein the vehicle wheel is a well attached type of wheel.

15. The vehicle wheel defined in claim 11 wherein the vehicle wheel is a bimetal type of wheel.

16. The vehicle wheel defined in claim 11 wherein the vehicle wheel is a modular type of wheel.

* * * * *